US009182864B2

(12) United States Patent
Mohindra et al.

(10) Patent No.: US 9,182,864 B2
(45) Date of Patent: Nov. 10, 2015

(54) PRESSURE SENSITIVE PROJECTED CAPACITIVE TOUCH SENSING

(71) Applicant: Rajkumari Mohindra, Milpitas, CA (US)

(72) Inventors: Rishi Mohindra, Milpitas, CA (US); Rajkumari Mohindra, Milpitas, CA (US)

(73) Assignee: Rajkumari Mohindra, Milpitas, CA (US)

( * ) Notice: Subject to any disclaimer, the term of this patent is extended or adjusted under 35 U.S.C. 154(b) by 207 days.

(21) Appl. No.: 13/907,992

(22) Filed: Jun. 3, 2013

(65) Prior Publication Data

US 2014/0354587 A1 Dec. 4, 2014

(51) Int. Cl.
G06F 3/044 (2006.01)
G06F 3/01 (2006.01)
G06F 3/041 (2006.01)

(52) U.S. Cl.
CPC .............. *G06F 3/044* (2013.01); *G06F 3/016* (2013.01); *G06F 3/0414* (2013.01); *G06F 2203/04809* (2013.01)

(58) Field of Classification Search
CPC ..................................................... G06F 3/044
USPC ......................................................... 345/174
See application file for complete search history.

*Primary Examiner* — Fred Tzeng (57) ABSTRACT

A projected capacitive touch panel that can detect touch pressure. The cover layer of projected capacitive touch panel has protrusions with gaps that fill up partially when finger is pressed, thereby registering a large change in projected capacitance. A keyboard using such device with optional mechanical switches underneath the touch surface for tactile feedback. Haptic feedback is coupled to detection of touch pressure. Reconfigurable keyboard and trackpad regions on a touch panel sensitive to touch pressure with tactile feedback from underlying mechanical switches. A mouse with left and right click support using projected capacitive touchpad with pressure detection for mouse click. Human finger based mimicking of mouse operation in combination with touch pressure detection. Supporting gestures that use touch pressure. Providing a visual feedback in an underlying display when touch pressure is detected. Providing an audio feedback when touch pressure is detected.

19 Claims, 9 Drawing Sheets

PRESSURE SENSITIVE PROJECTED CAPACITIVE TOUCH SENSING

RELATED APPLICATIONS

This application claims the benefit of U.S. Patent Provisional Application No. 61/654,957, filed Jun. 4, 2012, and titled "PRESSURE SENSITIVE PROJECTED CAPACITIVE TOUCH SENSING," which is herein incorporated by reference in its entirety.

The present application is related to U.S. Pat. No. 8,139,035 B2, dated Mar. 20, 2012, for TOUCH SENSITIVE KEYPAD WITH TACTILE FEEDBACK, included by reference herein.

The present application is related to United States patent application US 2010/00860593 A1, published Mar. 11, 2010, for PHASE COMPENSATION FOR MULTI-STIMULUS CONTROLLER, included by reference herein.

Validation of a 3-D Finite Element Human Fingerpad Model Composed of Anatomically Accurate Tissue Layers, by Matt B. Wagner, Gregory J. Gerling, and Jacob Scanlon, Department of Systems and Information Engineering, University of Virginia, USA Italian National Research Council website at http://niremf.ifac.cnr.it/tissprop/htmlclie/htmlclie.htm

FIELD OF THE INVENTION

This invention relates generally to projected capacitive touch-sensitive devices, particularly those that rely on an electrical coupling between a user's finger and a touch device, with particular application to such devices that are capable of detecting multiple touches applied to different portions of the touch device at the same time.

BACKGROUND

Projected capacitive touch panels are used very widely today in mobile devices like smartphones, tablets etc. While they enable a display area to be reused for touch, they do not offer the same user experience of a pressure sensitive keyboard with tactile feedback to the finger.

For dedicated keyboards, in U.S. Pat. No. 8,139,035 B2 titled "TOUCH SENSITIVE KEYPAD WITH TACTILE FEEDBACK," a touch sensitive surface is placed on top of a mechanical keyboard switch arrangement that provides tactile feedback, while the switch arrangement itself has electrical connectivity for indicating touch.

Very low profile mechanical keyboards have a limited electrical contact life though the tactile life of each key can be significantly larger. It is expensive to replace these keyboards in notebook PCs.

United States patent application US 2010/00860593 A1, published Mar. 11, 2010, for PHASE COMPENSATION FOR MULTI-STIMULUS CONTROLLER, describe the operation of a projected capacitance touch panel. It is referenced for the description of prior art regarding the operation of the projected capacitance touch panel.

SUMMARY

In view of the foregoing, a projected capacitive multi-touch sensing method is disclosed for detecting touch pressure, and for offering tactile or haptic feedback. While only the details of the panel itself had been described, it is assumed to include a suitable touch controller IC with associated firmware. A capacitive touchpad has unlimited life in terms of equivalent electrical connectivity of keyboard switches, and with a combination of pressure sensitivity and tactile or haptic feedback, the user experience can be significantly improved, and a dedicated mechanical keyboard can be replaced by a much lower profile touch-based keyboard with tactile feedback.

An embodiment of the patent includes a pressure sensitive projected capacitive touch panel. In one embodiment of the patent, a haptic feedback is given whenever a pressed condition is detected by the pressure sensitive projected capacitive touch panel. In another embodiment of the patent, a projected capacitive touch surface that is sensitive to touch pressure, is placed on a dummy low-profile keyboard switch that is only used for tactile feedback. The low-profile keyboard switch could be dedicated to each alphanumeric key, or to a region of the keyboard or to the entire keyboard. In another embodiment of the patent, a dedicated pressure sensitive touch enabled keyboard is reused as a trackpad. In another embodiment, the trackpad is a fixed extension of the keyboard, while in another embodiment the trackpad can be extended from under the keyboard. In another embodiment, a passive mouse technology is used on the pressure sensitive touch enabled trackpad, while in yet another embodiment the human fingers double as a mouse on the pressure sensitive touch enabled trackpad. In another embodiment of the patent, a pressure sensitive touch enabled keyboard comprising of virtual keys are redefined either completely or in sections for different applications like gaming, mouse and trackpad combination, special drawing enabled trackpad region that can for example automatically straighten lines and draw smooth curves with zoom in and zoom out based on touch.

DETAILED DESCRIPTION

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Furthermore, although embodiments of the invention may be described and illustrated herein in terms of double-sided Indium Tin Oxide (DITO) touch sensor panels, it should be understood that embodiments of the invention are also applicable to other touch sensor panel configurations, such as configurations in which the drive and sense lines are formed on different substrates or on the back of a cover glass, and configurations in which the drive and sense lines are formed on the same side of a single substrate.

Figure 1:
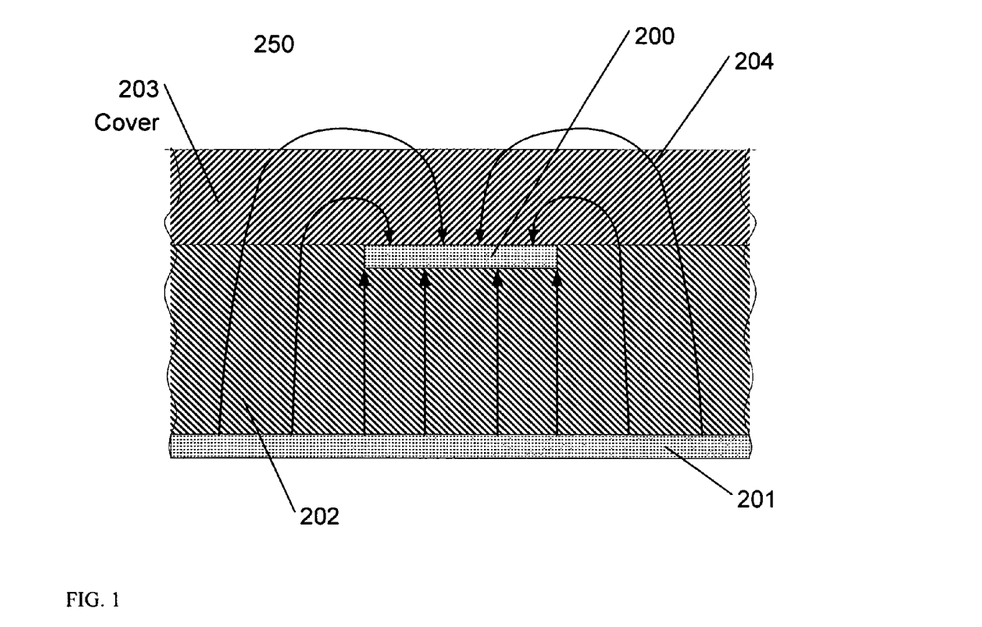
FIG. 1 is a cross section of a projected capacitive touch panel and it illustrates a projected capacitance electric field lines under no-touch conditions, according to prior art.

FIG. 1 is a cross section of a flat projected capacitive touch panel 250 and it illustrates a projected capacitance electric field lines under no-touch conditions, according to prior art. 200 is a sense electrode, 201 is a drive electrode, 202 is a dielectric separating sense and drive electrodes, 203 is a top-layer dielectric material usually comprising of a uniformly thick cover glass sheet, and 204 are exemplary traces of electric field lines between drive and sense electrodes. While FIG. 1 shown only one sense 200 electrode and one drive 201 electrode in the cross section view of a projected capacitive touch panel 250, the panel 205 comprises a plurality of drive 201 electrodes and a plurality of sense 201 electrodes. The sense electrodes 200 are orthogonal to the plane of the cross section i.e. to the plane of FIG. 1, while the drive electrodes 201 are tangential to the plane of the cross section. All sense 200 electrodes are parallel to each other, and all drive 201 electrodes are parallel to each other, within the plane of the panel 250. The flat projected capacitive touch panel 250 is placed above a flat electronic display panel that is usually an LCD or AMOLED display panel (not shown). In a projected capacitive touch panel, as shown in FIG. 1 for the cross-section, the drive electrodes 201 injects signal onto the sense electrodes 200. These two sets of electrodes are orthogonal and separated by a dielectric layer 202. The sense electrode 200 as shown in FIG. 1, is intruded into the dielectric material 202. A cover glass 203 is used to cover the sense electrodes. The electric field lines 204 as shown in FIG. 1 are for the no-touch condition. The sense electrodes 200 are at virtual ground potential, while the drive electrodes 201 carry a drive signal.

Figure 2:
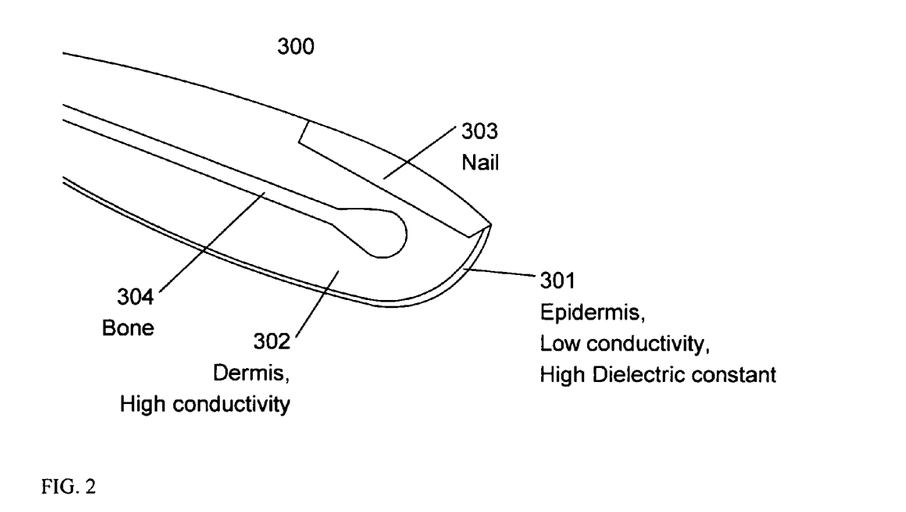
FIG. 2 illustrates the cross-section of the human finger including the skin.

FIG. 2 illustrates the cross-section of a human finger 300 including the skin. The outer layer of the skin called the epidermis, has a thick layer 301 which has a high dielectric constant but low conductivity. The inner layer of the skin 302 called the dermis, has high conductivity and provides the grounding effect to the touch panel when the panel is touched. In table 1 of the reference "Validation of a 3-D Finite Element Human Fingerpad Model Composed of Anatomically Accurate Tissue Layers," by Matt B. Wagner, Gregory J. Gerling, and Jacob Scanlon, Department of Systems and Information Engineering, University of Virginia, USA, the mean thickness of the outer epidermis layer is about 0.37 mm. FIG. 3 in this reference shows that a 1 mm displacement of the skin from a sharp edge results in 50% return to normal at a distance of 1.5 mm from the sharp edge. However with a hard press, the 50% return to normal would occur at a much shorter distance. This property of the human skin is used in this patent to define the height of ridges and the separation of these ridges for pressure detection, as described later. From the Italian National Research Council website at http://niremf.ifac.cn-r.it/tissprop/htmlclie/htmlclie.htm, the dielectric constant of skin is shown to be extremely high between 1100 and 15000, while the conductivity is extremely low in the range of 0.00045 to 0.0066. This high value of the dielectric constant combined by the low conductivity helps in increasing the projected mutual capacitance when the skin is in close proximity between the sense electrode and drive electrode of the touch panel.

Figure 3:
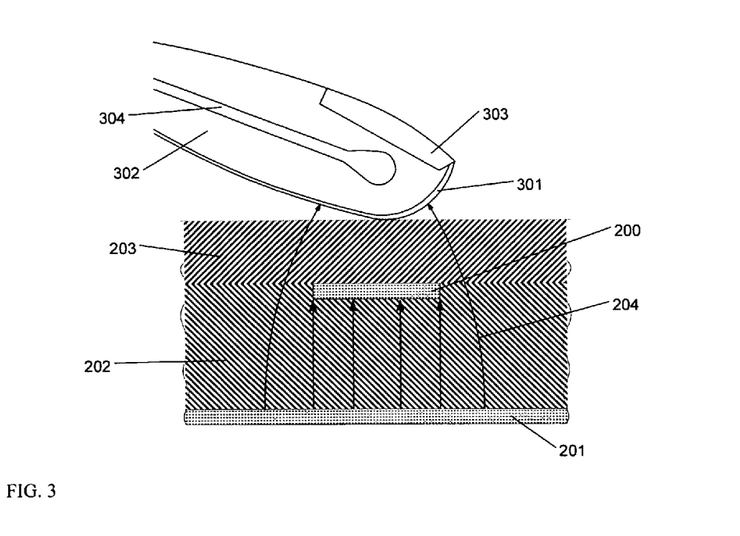
FIG. 3 is a cross section of a projected capacitive touch panel and it illustrates a projected capacitance electric field lines under touch conditions in presence of a human finger, according to prior art.

FIG. 3 is a cross section of a projected capacitive touch panel and it illustrates a projected capacitance electric field lines under touch conditions in presence of a human finger, according to prior art. FIG. 3 shows the electric field lines 204 of a projected capacitive touch panel under touch conditions i.e. when the human finger layer 301 is touching the uniformly thick cover glass 203. Due to a large external capacitive coupling between the human body and the touch panel's system ground that is normally a conductive layer much below the transmit (201) and sense (200) electrodes, the finger is at the same AC ground potential as a sense electrode 200 that is maintained at a virtual AC ground by a sensing electronic circuit. Because of this, some of the electric field 204 lines between the driver 201 and sense 200 electrodes are terminated on the human finger layers 301 and 302 instead of being terminated on the sense electrode 200. This reduces the capacitance between the sense 200 and the drive 201 electrodes, and this change in capacitance is used to decode the touch information. However this method is not able to decode the pressure information of the touch unless it results in a large increase of the touch area under the finger. This increase in area is unreliable and dependent on the position of the human finger.

Figure 4:
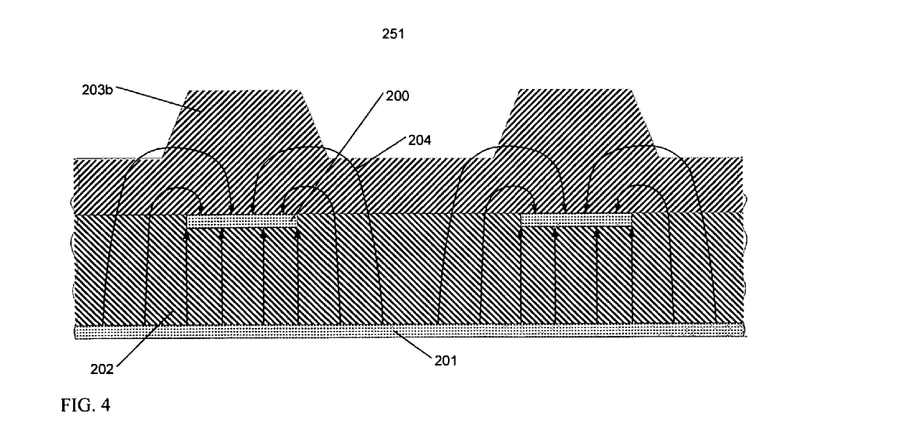
FIG. 4 illustrates the cross-section of a projected capacitive Pressure sensitive touch panel according to an embodiment of this patent. It is shown for the no-touch condition, and shows protrusions in the top layer according to an embodiment of this patent.

FIG. 4 illustrates the cross-section of a projected capacitive Pressure sensitive touch panel according to an embodiment of this patent. It is shown for the no-touch condition, and shows protrusions in the top layer cover glass according to an embodiment of this patent. The cover glass 203b instead of being uniformly thick, has ridges or protrusions running parallel to the sense electrodes, as shown in this figure by the varying thickness of this layer, compared to the uniform thickness of 203 in FIG. 3. The ridges are formed by reducing the thickness of the cover glass from around 0.7 mm to about 0.1-0.2 mm typically between the ridges, while maintaining the thickness of the ridges at 0.5-0.7 mm.

Figure 5:
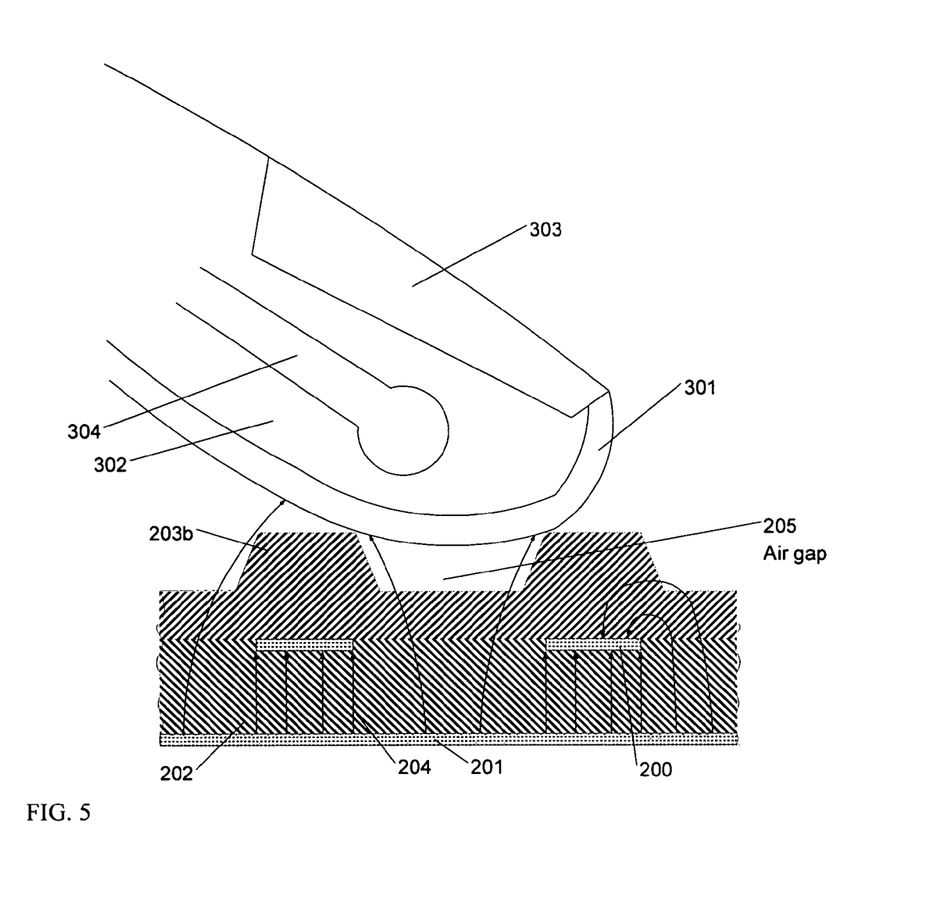
FIG. 5 illustrates the cross-section of a projected capacitive Pressure sensitive touch panel according to an embodiment of this patent. It is shown for the touch condition in presence of a human finger, and shows protrusions in the top layer according to an embodiment of this patent. It is shown for the non-pressed condition.
Figure 8:
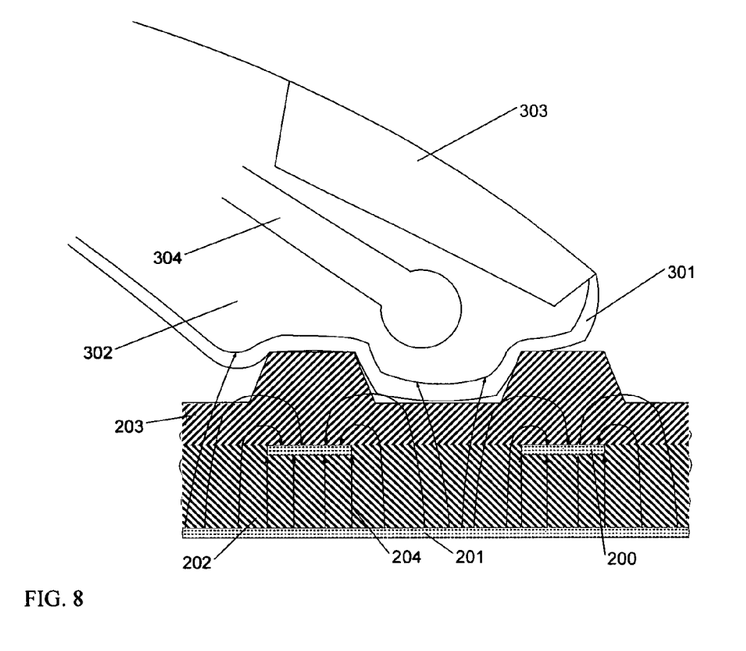
FIG. 8 illustrates the cross-section of a projected capacitive Pressure sensitive touch panel according to an embodiment of this patent. It is shown for the touch condition in presence of a human finger, and shows protrusions in the top layer according to an embodiment of this patent. It is shown for the pressed condition.

FIG. 5 illustrates the cross-section of a projected capacitive Pressure sensitive touch panel according to an embodiment of this patent. It is shown for the touch condition in presence of a human finger, and shows protrusions in the cover glass 203 according to an embodiment of this patent. It is shown for the non-pressed condition. Under normal touch as shown in FIG. 5, some of the electric field lines 204 that terminate on the sense electrode 200, are stolen by the finger layers 301 and 302, thereby reducing the capacitance between the sense 200 and drive 201 electrode during touch i.e. when finger layer 301 touches cover glass 203. During normal touch there is an air gap 205 between the finger layer 301 and the non-uniformly thick cover glass 203. This capacitance reduction effect is the same as in prior art. However, during a pressed condition as shown in FIG. 8, the outer region of the epidermis layer 301 of the finger covers the gaps (205 in FIG. 5) between the ridges that would normally have been an air gap under non-pressed touch conditions. The effect of filling up the air gaps between the ridges of the cover glass 203 is to significantly increase the effective thickness of the cover glass, with a huge increase in the dielectric constant of this layer, largely determined by that of epidermis layer 301. It results in a large increase in electric fields 204 that terminate on the sense electrode 200, thereby increasing the capacitance between the driver 201 and sense 201 electrodes instead of reducing it. Whereas a regular touch decreases this capacitance, a pressed condition increases the capacitance. Therefore, both regular touch and pressure can be detected by determining whether capacitance has decreased or increased. In regular touch panel the pitch of the drive and sense electrodes is approximately 5 mm. However this is extremely wide for pressure sensing since the finger could fill the void between the ridges even without significant pressure. In order to make the pressure sensing work i.e. for the air gaps between the ridges of cover glass 203 to fill up with the epidermis layer 301 of the finger only under reasonable pressure, the spacing of the ridges has to be reduced to a pitch of 2-3 mm. The pitch of the sense 200 traces and the drive 201 traces can also be optionally maintained at this range of value instead of a typical 5 mm value.

Figure 6:
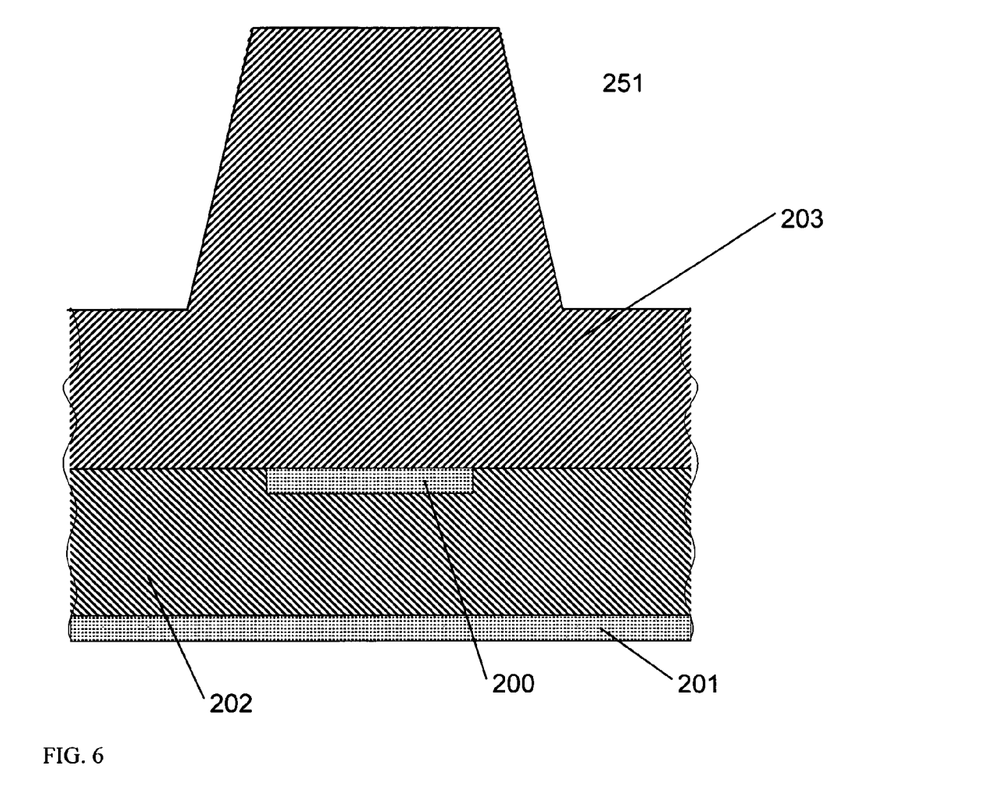
FIG. 6 and FIG. 7 illustrate the cross-section of pressure sensitive projected capacitive touch panel based on other embodiments of this patent relating to the placement of the upper electrode.
Figure 7:
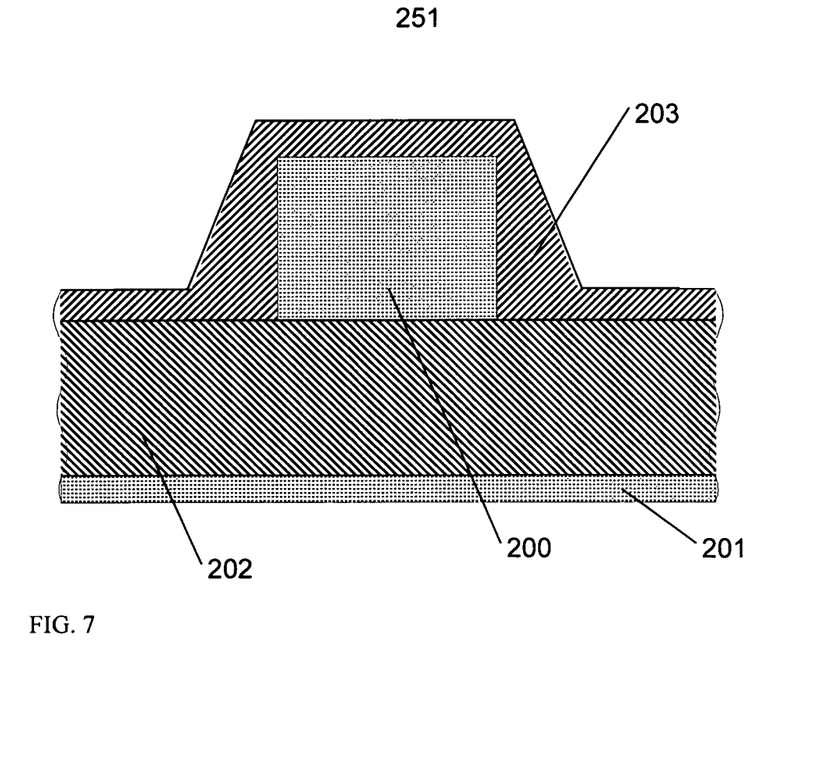

FIG. 6 and FIG. 7 are other embodiments of the patent showing the cross section of projected capacitive touch panel. In FIG. 6, the dielectric layer 202 between the drive 201 and sense 200 electrodes are much thinner than that of the cover glass 203 of a projected capacitive touch panel 251. This is typically the case for mobile cellular phone devices. According to this patent, the cover glass 203 in not uniformly thick, but has ridges or protrusions on the top outer surface, running parallel to either sense 200 electrodes or to drive 201 electrodes or to both. FIG. 7 is the case for a projected capacitive touch panel printed circuit board 251 that is used for a keyboard and trackpad. The sense electrode 200 are copper traces covered with a scratch resistance smooth insulating material 203 like Teflon etc. The dielectric material 202 is usually made of FR4 material for printed circuit boards, and separates the sense 200 and drive 201 electrodes. The ridges or protrusions in the cover layer 203 comprises the material 203 above sense electrodes 200, and also the material in the sense electrode 200.

According to another embodiment of the patent, instead of having ridges in the cover glass that run parallel to only the sense electrodes, dummy parallel ridges could also be included to run in a perpendicular direction to the sense electrodes for better touch experience. These electrodes would run in parallel to the drive electrodes and would ideally be placed at the border between the drive electrodes. The cover glass refractive index can optionally be suitably graded so that the ridges do not create significant optical distortions.

Figure 9:
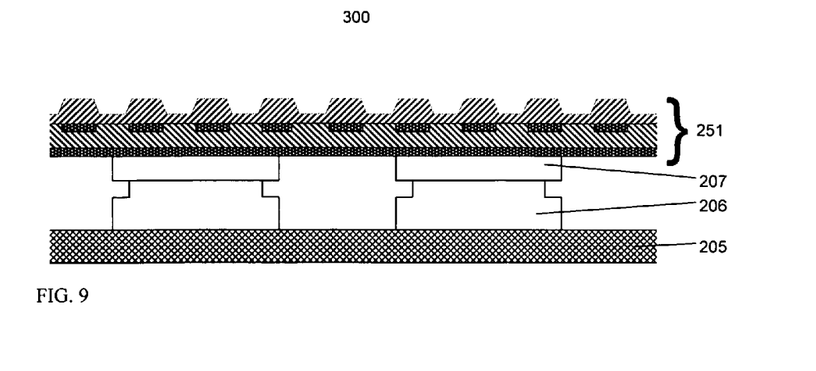
FIG. 9 illustrates the cross-section of a pressure sensitive projected capacitive touch panel using dummy mechanical switches under it for tactile feedback. The dummy switches are just mechanical contraptions without electrical connections, but optionally could also have electrical connections for pressed-touch detection, for robustness.

FIG. 9 shows an embodiment of the patent for tactile feedback. FIG. 9 illustrates the cross-section of a pressure sensitive projected capacitive touch panel 251 using dummy mechanical switches under it for tactile feedback. The dummy switches are just mechanical contraptions without electrical connections, but optionally could also have electrical connections for pressed-touch detection, for robustness. The pressure sensitive projected capacitive touch panel 251 is made flexible, and sits on top of mechanical switches comprising of movable part 207 and fixed part 206 that provide the tactile feedback when pressed. The fixed part 206 is attached to a rigid base layer 205 that could be part of a printed circuit board and could optionally be made of FR4 material. The dummy switches comprising of 206 and 207 need not have any electrical contacts, but in another embodiment of the patent, could also have them in order to indicate through their electrical contacts closure a positive touch pressure for improved robustness. There could be one electrical or dummy mechanical switch for every alphanumeric position of the keyboard, or several virtual keys could share one electrical or dummy mechanical switch, or the entire keyboard could have just one electrical or dummy mechanical switch, which could optionally rock in different directions. There could be LED or LCD under the alphanumeric numbers that light up when the corresponding key is pressed.

For a transparent cover glass with ridges running along the columns, the touch panel is intended to be used with the display underneath. A haptic feedback can be given whenever pressed condition is detected, for improved user experience. An audio feedback could also be given, and the area under the pressed key could also be made to change color. In another embodiment of the patent, LCD, LED, AMOLED or suitable display under the touch panel can be used to visually indicate through suitable means of highlighting or color change or animation, the region or text or key where finger is touching or hovering, and a different visual indication could be given when touch pressure is detected. This could be combined with an audio indication e.g. a click sound could be given to indicate detection of pressure.

Figure 10:
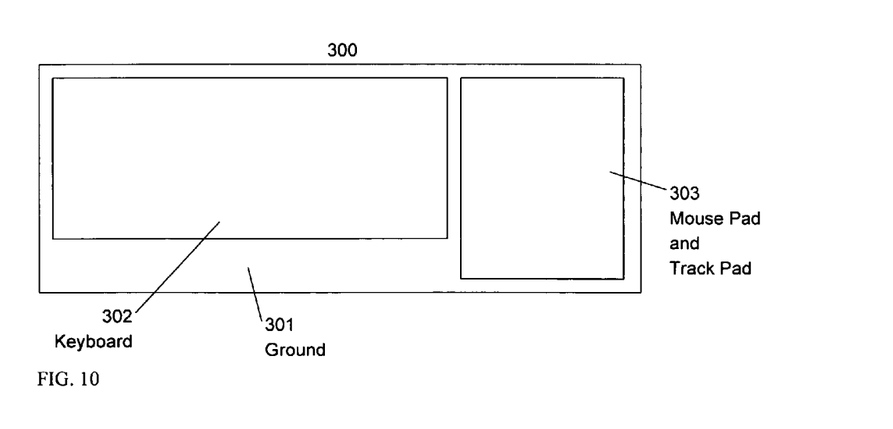
FIG. 10 shows a single piece low-profile keyboard and trackpad combination, using pressure sensitive projected capacitive touch panel according to an embodiment of this patent. The trackpad can double as a mouse pad that can also work with a passive mouse. The passive mouse is another embodiment of the patent.

FIG. 10 shows a single piece low-profile keyboard 300 and trackpad 303 combination 300, using pressure sensitive projected capacitive touch panel. The trackpad can double as a mouse pad that can also work with a passive mouse. The passive mouse is another embodiment of the patent. Also shown is a ground layer 301 that helps to improve the ground coupling of the keyboard 302 with the human body or hand (nor shown). The keyboard can use low-profile mechanical switches comprising of movable part 207 and fixed part 206 of FIG. 9 for tactile feedback, or could use haptic feedback. The drive electrodes could run horizontally covering the keyboard 300 and trackpad 303, while the sense electrodes could run vertically, as an example. The trackpad 300 can be used to operate a virtual mouse using just the human fingers. For example, the index finger of the right-hand could be used for the mouse operation, and pressing it could indicate the left mouse click, while pressing the middle finger while simultaneously touching the index finger, could indicate the right mouse click. Various other gestures can be incorporated by including pressure information for improved user experience, according to an embodiment of this patent.

Figure 11:
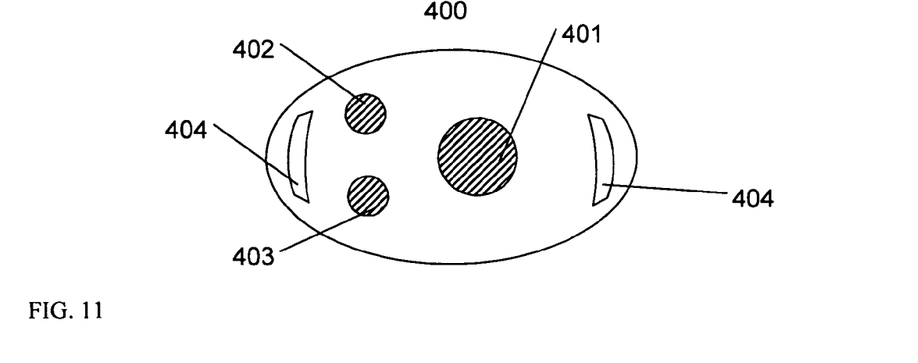
FIGS. 11, 12 and 13 show a construction of a passive mouse according to an embodiment of this patent.
Figure 12:
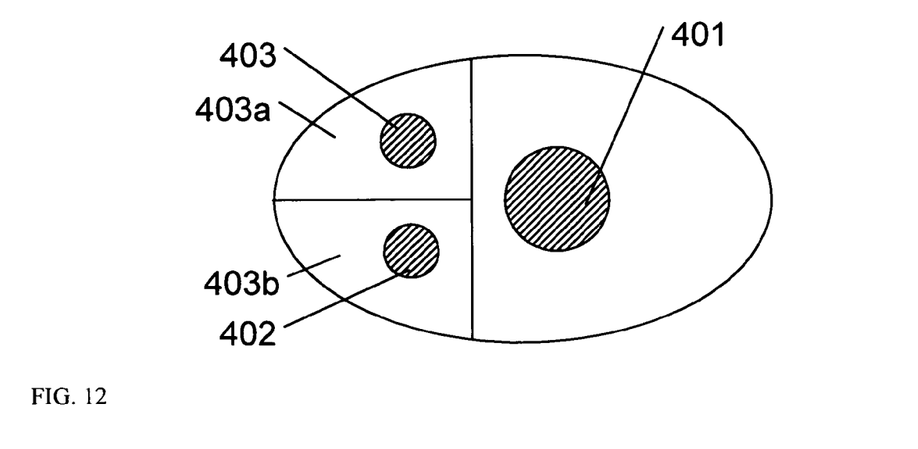
Figure 13:
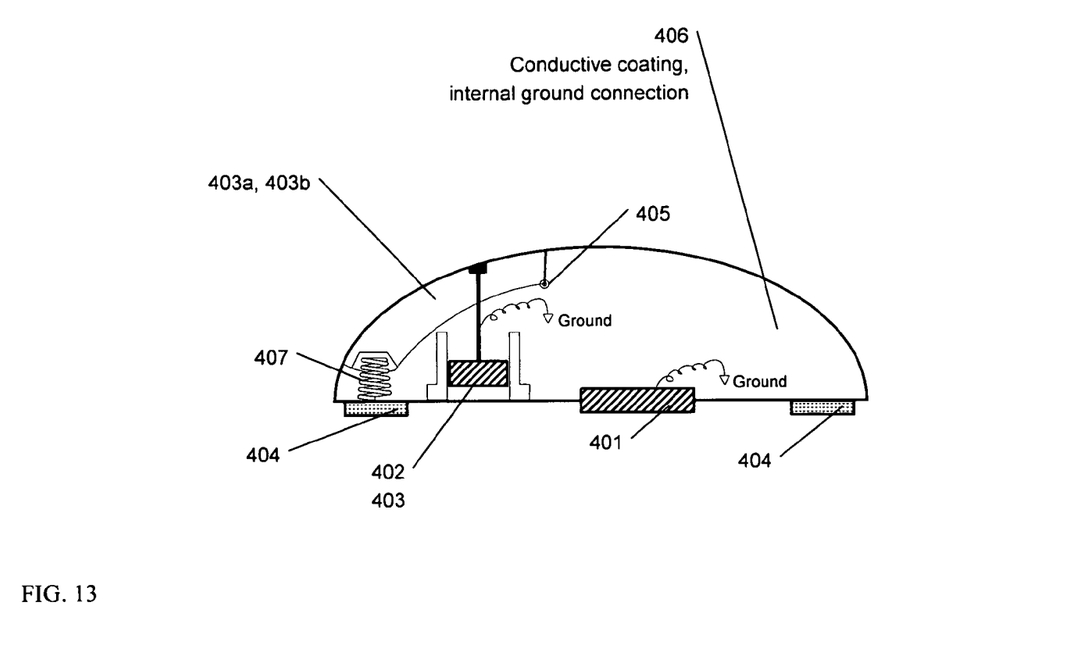

FIGS. 11, 12 and 13 show a construction of a passive computer mouse according to an embodiment of this patent. While a regular computer mouse works on a passive surface, the passive mouse according to an embodiment of this patent, works on a trackpad that comprises a projected capacitive touch panel and serves as a mouse pad. The trackpad 303 of FIG. 10 can be used as a mouse pad with a passive mouse 400 that is shown in FIG. 11 for the bottom view, FIG. 12 for the top view and FIG. 13 for the side view. The bottom surface of the passive mouse is flat and has three conductive surfaces 401, 402 and 403 as shown in FIG. 11. It also has two low-friction surfaces 404 for aiding smooth movement of the passive mouse on a trackpad, The top surface of the passive mouse is curved and includes a conductive layer, and a side view cross section is depicted in FIG. 13. The front part of the top surface includes two switch surfaces 403b and 403a as shown in FIG. 12, for left-click and right click of the mouse respectively. The placement of the conductive discs 401, 402 and 403 relative to the left-click and right click switch surfaces are also depicted in FIG. 12 by the shaded regions. FIG. 11 shows the bottom surface of the passive mouse that sits on top of the trackpad 303 of FIG. 10. The position of the mouse is tracked by the circular conductive disk 401 which creates a touch on the said trackpad 303. As shown in FIG. 13, the circular disk 401 is connected to the top outer curved shell 406 of the mouse which is conductive and is in close proximity with a human hand and therefore at the same potential as the human body. This connection to 406 is depicted in FIG. 13 as a triangular electrical "ground" symbol at one end of a wire with the other end connecting to 401. Also used are smaller circular conductive disks 402 and 403 for the mouse clicks. Circular disks 403 and 402 do not normally extrude out of the bottom surface 400, but are pushed out by the left and right click switches 403b and 403a of the mouse respectively using a conductive piston arrangement as shown in FIG. 13 as a line joining 402 and 403 to 406 with a pivoting mechanical connection of this line to 406 shown by a shaded region just below 406 and on top of this line. The conductive piston is electrically connected to 406 using a wire. One end of this wire connects to the line depicting the piston in FIG. 13, while the other end of this wire is connected to 406, with this connection depicted in FIG. 13 as a triangular electrical "ground" symbol. The left click 403b and right click 403a switches rest on individual springs 407 as depicted in FIG. 13, for tactile feedback and for "normally off" switch operation. 403a and 403b are hinged to the mouse body at the contact region 405 as shown in FIG. 13. The protrusions 404 at the two ends of the lower surface of the mouse have low friction and are used for gliding the mouse smoothly on the projected capacitive trackpad 303 based mouse pad. The circular discs 402 and 403 could optionally have a soft surface to mimic the mushy human finger in order to detect pressed condition, according to another embodiment of this patent.

In another embodiment of the patent, circular discs 402 and 403 are permanently attached to the bottom flat surface, and are electrically connected to the top curved shell 406 whenever the corresponding left mouse click 403b and right mouse click 403a button is pressed. The click buttons close an electrical switch each, when pressed.

What is claimed is:
1. A projected capacitive touch panel for detecting both touch as well as pressing of a finger on a touch panel comprising:
   a plurality of drive electrodes that are conductive;
   a plurality of sense electrodes that are conductive;
   a layer of nonconductive material separating said drive electrodes from said sense electrodes;
   a cover layer with an underside and a topside, comprising of a nonconductive material, positioned above said sense electrodes and above said drive electrodes, wherein said cover layer has ridges that protrude out from said topside;
   wherein a capacitance is formed between each of said drive electrode and each of said sense electrode;
   wherein said capacitance between any said drive electrode and any said sense electrode reduces under influence of touch on said topside of said cover layer by a finger covering both said electrodes at their intersection in said panel, and then further increases with pressing of said finger on said cover layer by exertion of force by said finger on said panel;
   wherein said further increase in said capacitance is produced by the pressing of said finger into the region between said ridges.

2. A device as claimed in claim 1, wherein said cover layer has some of said ridges running substantially parallel to said sense electrodes.

3. A device as claimed in claim 1, wherein said cover layer has some of said ridges running substantially parallel to said drive electrodes, thereby providing a better touch experience to users.

4. A device as claimed in claim 1, further comprising a haptic feedback wherein said haptic feedback is activated upon detecting said pressing of finger, thereby providing improved user experience.

5. A device as claimed in claim 1, wherein said cover layer is transparent and has a graded refractive index, thereby reducing optical distortions when viewing underlying display.

6. A device as claimed in claim 1, further comprising of one or more mechanical switches that are placed under the combination of said drive electrodes and said sense electrodes, thereby providing tactile feedback.

7. A device as claimed in claim 6, further comprising a haptic feedback wherein said haptic feedback is activated upon detecting said pressing of finger, thereby providing improved user experience.

8. A device as claimed in claim 1, further comprising:
   a region of said sense and drive electrodes for use as keyboard;
   a region of said sense and drive electrodes for use as trackpad.

9. A device as claimed in claim 8, wherein said regions are electronically re-configurable.

10. A device as claimed in claim 8, further comprising a detached mouse device comprising:
    a hand-held shell with a curved upper surface with a conductive layer for electrically coupling to human hand, and a flat bottom surface for gliding over a touchpad;
    a substantially circular conductive disk at the bottom surface of said shell, electrically connected to said upper conductive surface layer of said shell, wherein said conductive disk provides for mouse position tracking through capacitive touch detection using said trackpad.

11. A device as claimed in claim 10, further comprising:
    one or more mouse-click buttons on said curved upper surface, wherein these buttons are pressed by human finger for mouse-click operation;
    one or more substantially circular movable secondary conductive disks inside said hand-held shell, each attached to a spring-loaded rod that can push them to the bottom surface of said hand-held shell upon pressing of said buttons, wherein said secondary conductive disks are electrically connected to said curved upper conductive surface of said hand-held shell, thereby enabling detection of mouse-click by capacitive touch detection through said trackpad;
    mechanism to hold said buttons and to provide tactile feedback upon pressing and releasing said buttons;
    one or more smooth pads at the bottom surface of said hand-held shell, for reducing friction during mouse movement on said trackpad.

12. A device as claimed in claim 10, further comprising:
    one or more mouse-click buttons on said curved upper surface, wherein these buttons are pressed by human finger for mouse-click operation, and wherein these buttons close an electrical switch each when pressed;
    a substantially circular conductive disk at the bottom surface of said shell, electrically connected to said upper conductive surface layer of said shell, wherein said conductive disk provides for mouse position tracking through capacitive touch detection using said trackpad;

one or more substantially circular secondary conductive disks at the bottom surface of said shell, wherein said secondary conductive disks are electrically connected to said curved upper conductive surface of said hand-held shell through said electrical switch, thereby enabling detection of mouse-click by capacitive touch detection through said trackpad;

mechanism to hold said buttons and to provide tactile feedback upon pressing and releasing said buttons;

one or more smooth pads at the bottom surface of said hand-held shell, for reducing friction during mouse movement on said trackpad.

13. A method of detecting both touch as well as pressing of a finger on a touch panel through projected capacitive sensing, the method comprising:

providing a panel comprising a touch surface, a plurality of drive electrodes, and a plurality of sense electrodes;

providing a nonconductive medium separating said electrodes;

providing a cover layer with an underside and a topside, comprising of a nonconductive material, and positioning it above said sense electrodes and above said drive electrodes;

forming in said cover layer ridges that protrude out from said topside;

measuring capacitance between said sense electrodes and said drive electrodes formed at intersections between said sense electrodes and said drive electrodes;

determining touch of a finger based on said capacitance measurement;

determining position of said touch based on said projected capacitance measurement;

determining pressing of said finger on said panel based on said capacitance measurement, wherein said pressing of said finger is determined from said capacitance increasing with force exerted by said finger on said panel, and wherein said increase in said capacitance is produced by pressing of said finger into regions between said ridges under said finger.

14. The method of claim 13 further comprising of mimicking mouse operation using said determination of touch and said determination of position and said determination of pressing of finger, wherein a mouse click is recognized as a pressed finger, and wherein left and right mouse click is recognized when two fingers are touching and the corresponding left or the right touching finger is pressed respectively.

15. The method of claim 13 further comprising of recognizing gestures that use pressing of finger on touch panel.

16. The method of claim 13 further comprising of providing a haptic feedback wherein said haptic feedback is activated upon said determination of pressing of finger exceeding a threshold value, thereby providing improved user experience.

17. The method of claim 13 further comprising of providing a visual feedback in an underlying display wherein said visual feedback is activated upon said determination of pressing of finger exceeding a threshold value, thereby providing improved user experience.

18. The method of claim 13 further comprising of providing an audio feedback wherein said audio feedback is activated upon said determination of pressing of finger exceeding a threshold value, thereby providing improved user experience.

19. The method of claim 13 further comprising of forming grooves and ridges on said underside of said cover layer wherein said grooves encompasses said sense electrodes or said drive electrodes or both.

* * * * *